(12) United States Patent
Neumeister

(10) Patent No.: US 7,241,134 B2
(45) Date of Patent: Jul. 10, 2007

(54) ENHANCING COMBUSTION WITH VARIABLE COMPOSITION PROCESS GAS

(75) Inventor: Lawrence Dwayne Neumeister, Sherwood Park (CA)

(73) Assignee: Spartan Controls Ltd., Calgary, Alberta (CA)

( * ) Notice: Subject to any disclaimer, the term of this patent is extended or adjusted under 35 U.S.C. 154(b) by 106 days.

(21) Appl. No.: 10/463,236

(22) Filed: Jun. 16, 2003

(65) Prior Publication Data

US 2004/0253557 A1    Dec. 16, 2004

(51) Int. Cl.
*F23G 7/08* (2006.01)
*F23D 14/00* (2006.01)
*F23J 15/00* (2006.01)

(52) U.S. Cl. .............................. 431/5; 431/10; 431/12

(58) Field of Classification Search .................... 431/2, 431/5, 10, 12
See application file for complete search history.

(56) References Cited

FOREIGN PATENT DOCUMENTS

JP          57028922 A  *  2/1982

* cited by examiner

*Primary Examiner*—Jiping Lu
(74) *Attorney, Agent, or Firm*—John Russell Uren (57) ABSTRACT

Method and apparatus for enhancing the combustion of a process gas of variable composition which gas is used for steam generation in producing heavy oil. The mass flow of the process gas containing hydrocarbons, carbon dioxide and water is measured. It is assumed that the process gas is saturated with water vapor and the water content of the process gas is then obtained. The content of carbon dioxide in the process gas is nominally obtained with an oxygen analyser measuring the flue gas from a steam generator thereby giving a close approximation of hydrocarbon content and allowing an expedited calculation of the energy content and air required. The nominal carbon dioxide value is compared with the calculated carbon dioxide value based on the actual flow of process gas and purchase gas and the oxygen content so that the quantity of carbon dioxide is approximated. If increased flow of the process gas is required, changes in the flow of the introduced air can be quickly made without relying exclusively on oxygen analysis of the exhaust gas from the steam generation process. Steam of a desired energy content and quantity for well injection purposes may also be produced.

10 Claims, 5 Drawing Sheets

ENHANCING COMBUSTION WITH VARIABLE COMPOSITION PROCESS GAS

This invention relates to a method of optimizing the combustion of a process gas obtained during the production of heavy oil using steam injection and, more particularly, to a method of enhancing the combustion of the process gas by determining the energy content of a variable composition process gas and thereafter providing the optimum ratio of fuel to water and/or air to fuel relative to the energy content of the process gas.

BACKGROUND OF THE INVENTION

The use of steam to enhance the production of heavy oil from heavy oil bearing formations is known. Heavy oil is highly viscous at room temperatures which makes easy flow of such heavy oil difficult. To enhance the flow rate, steam is typically generated on the surface and heated to a temperature of about 500 deg. F. The heated steam is injected into the heavy oil formation. The steam raises the temperature of the heavy oil in the formation thereby reducing its viscosity and allowing the oil to flow more easily towards the tubing of the well where the oil is then brought to the ground surface. The components of the heavy oil obtained typically include not only water and the desired oil but other hydrocarbons and carbon dioxide.

The gases are separated from the oil and water at the ground surface with a separator. The oil is usually the primary product intended to be obtained but the process gases are useful, particularly as a fuel for generating the steam used in the formation injection process.

The composition of the process gas separated from the oil is variable, not only in hydrocarbons, but also in water vapor and carbon dioxide. The energy content of the process gas is of interest since the use of the process gas to generate steam with a known energy content will be more efficient if the amount of air used is optimised and the amount of purchase gas required as a supplementary fuel is minimized. The energy of the process gas is primarily due to the hydrocarbons present as well as any hydrogen sulfide and/or hydrogen. The presence of non-hydrocarbons such as water vapor and carbon dioxide are essentially inert and do not contribute to the energy content of the process. Thus, the non-hydrocarbons reduce the overall energy content of the process gas but contribute to the mass of the process gas used for generating steam.

To assist in the combustion efficiency of the process gas used for generating the steam subsequently used for injection into the producing formation, a controlled flow of air from an external source is added to burn the process gas in the steam generator. The correct ratio of air to the hydrocarbons present in the process gas is desirable for optimum combustion.

The ratio between the hydrocarbons in the process gas and the air required for combustion, each on a volume basis, varies considerably with the composition of individual hydrocarbons in the process gas because the energy content of the individual hydrocarbons varies substantially on a volumetric (MJ/sm3) basis. On a mass basis (MJ/kg), however, the energy content of the total mass of hydrocarbons is substantially independent of the composition of the individual hydrocarbons making up the total mass. By obtaining the total mass of the hydrocarbons, air can be added without concern for the compositions of the individual hydrocarbons in the process gas. The mass flow rate of gases is readily measurable through the use of commercially available Coriolis mass flow meters and the like. The presence of non-hydrocarbons adds deviation to the air to fuel ratio, and the presence of non-hydrocarbons must be accounted for to optimize combustion.

To correctly determine the quantity of air required to be added so as to assist the combustion of the process gas in an optimal manner, the energy content of the process gas has heretofore been measured using a calorimeter. A calorimeter is an on-line instrument that takes a small sample of the process gas and burns it. The energy realised by the combustion of the small sample is measured and that energy quantity is then extrapolated to the process gas as a whole to obtain the overall energy content of the process gas. The air required for that value is then determined.

Calorimeters are expensive and the labor required for the maintenance of such calorimeters adds further expense and may not be readily available. Servicing of calorimeters is therefore a problem. Likewise, where there is a potentially hazardous location where combustion of hydrocarbons is not recommended, the use of calorimeters can be difficult or prohibited. Yet a further disadvantage is that the feed back time for obtaining information from the calorimeter is long. Any adjustment required to the gas and/or input air is which detracts from the early and continuous use of optimal airflow.

The amount of fuel required for the necessary steam generation used for formation injection is dependent on the flow rate of the water to the steam generator, the pressure of the steam generated for the injection, the quality of the steam required and the energy heat content of the process gas. Thus, the energy content of the combination of the process gas and purchase gas where the latter may be used if required, allows the calculation of both the correct air/fuel ratio and the correct fuel/water ratio for the desired steam generation. The energy content of the process gas is desirably obtained quickly to maximize combustion efficiency. It is therefore useful to obtain the mass content of the hydrocarbon, the water and the carbon dioxide within the process gas for optimal steam generation.

The carbon dioxide content of the process gas from hydrocarbon producing wells is known to change relatively slowly so that quickly processing the carbon dioxide content of the process gas is less important that quickly processing the quantity of hydrocarbons and water.

Measuring the total mass flow of gases containing hydrocarbons is known as described above. The use of such mass flow measurement, however, has heretofore been limited to the measurement of gases where hydrocarbons are the only gases present in the gas being analysed. In processing heavy oil using injected steam to enhance oil flow, the presence of non-hydrocarbons such as water vapor and carbon dioxide in significant quantities which accompany the hydrocarbons in the process gas is a unique consideration.

SUMMARY OF THE INVENTION

According to one aspect of the invention, there is provided a method of enhancing the combustion of a process gas with added air by adjusting the air used in said combustion comprising the steps of measuring the mass of said process gas provided for said combustion, estimating the mass of water in said process gas, obtaining the mass of non-combustible gases in said process gas by measuring the percentage of excess oxygen in the exhaust from said combustion of said process gas and said added air, obtaining the mass of hydrocarbons in said process gas and determining the optimum ratio of combustion air relative to said total mass-of said hydrocarbons in said process gas and increasing or decreasing the supply of said combustion air relative to said total mass of said hydrocarbons in said process gas.

According to a further aspect of the invention, there is provided a method of optimising the combustion of a process gas composed of hydrocarbon and non-combustible gases when the proportion of said non-combustible to said hydrocarbon gases increases or decreases, said method comprising increasing or decreasing the quantity of combustion air to said process gas in a ratio dependent upon the total mass of hydrocarbons, water and carbon dioxide in said process gas, analysing the excess oxygen content of the exhaust gases from the combustion of said process gas and said combustion air to ensure an adequate quantity of combustion air is present for said optimum combustion and increasing or decreasing said combustion air following said analysis in order to obtain said optimal combination of said combustion air and said process gas.

According to still yet a further aspect of the invention, there is provided a method of determining the content of hydrocarbons, non-combustible gas(es) and water in a process gas by analysing the exhaust obtained during the combustion of said process gas with added air, increasing or decreasing the supply of said added air to obtain substantially complete combustion of said process gas and determining the content of said non-combustible gases in said composition of said process gas and combustion air by measuring the excess oxygen output of said combustion of process gas and combustion air.

According to still yet a further aspect of the invention, there is provided a method of determining the energy content of a process gas containing hydrocarbons, non-combustible gas(es) and water comprising the steps of determining the mass of water in said process gas, adding combustion air to said process gas and combusting said mixture of said combustion air and process gas, assuming the ratio of said combustion air to said mass of hydrocarbons in said process gas is relatively constant, measuring the excess oxygen content from said combustion of said process gas and combustion air and determining the quantity of non-combustible gas(es) in said process gas from said mass of oxygen.

According to yet a further aspect of the invention, there is provided a method of determining the energy content of process gas as in claim 8 and further comprising adding air to said process gas such that combustion of said added air and process gas is optimised.

According to yet a further aspect of the invention, there is provided a method of enhancing the combustion of a process gas by adjusting added air to be used in said combustion comprising the steps of measuring the mass flow of said process gas, measuring the percentage of excess oxygen in the exhaust from said combustion of said air and process gas, obtaining the respective masses of non-combustible gas(es), hydrocarbons and water in said process gas from said obtained percentage of excess oxygen, determining the optimum ratio of combustion air relative to said total mass of said hydrocarbons and increasing or decreasing said combustion air in said ratio proportional to the increase or decrease in said total mass of said process gas supplied for said combustion.

According to yet a further aspect of the invention, there is provided a method of enhancing the combustion of a process gas composed of hydrocarbons and non-combustible gases and water when the proportion of said non-combustible gas(es) and/or water to said hydrocarbons increases or decreases, said method comprising increasing or decreasing the combustion air added to said process gas in a ratio dependent upon the total mass of said process gas, analysing the excess oxygen content of the exhaust gases from said combustion to ensure an adequate quantity of combustion air is present for optimum combustion of said process gas and increasing or decreasing said combustion air following said analysis of said exhaust gases thereby to more correctly approach said optimum combustion.

According to a further aspect of the invention, there is provide a method of determining the content of hydrocarbons, non-combustible gases and water in a process gas by analysing the exhaust from the combustion of said process gas and added air in a first measurement and thereafter adjusting the added air flow to improve the combustion of said process gas and further again analysing said exhaust from said combustion following said adjustment of said air flow in a second measurement.

According to a further aspect of the invention, there is provided apparatus for optimising the combustion of process gas used during steam generation by adjusting the addition of air to said process gas during said combustion, said apparatus comprising a mass flow meter for measuring the mass flow of said process gas containing hydrocarbons, at least one instrument for measuring the mass flow of said air added to said process gas in a predetermined ratio and a control unit for maintaining said predetermined ratio of said added air to said hydrocarbons in said process gas when said mass flow of said process gas is increased or decreased.

According to a further aspect of the invention, there is provided a method of generating steam of a desired quantity and energy content comprising introducing a quantity of process gas with a calculated energy content to produce a first energy source for generating said steam.

According to a further aspect of the invention, there is provided a method of generating steam of a desired quantity and energy content comprising introducing a quantity of process gas with a calculated energy content to produce a first energy source for generating said steam and supplementing said process gas with the introduction of a quantity of purchase gas, the total energy produced by said purchase and said process gas generating said desired quantity of said steam having said desired energy content.

According to yet a further aspect of the invention, there is provided apparatus for generating steam comprising means for introducing purchase gas to a steam generator and means for calculating the energy content of a process gas, said calculating means including means for measuring mass flow of said process gas and means for measuring excess oxygen from said combustion of said process gas.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
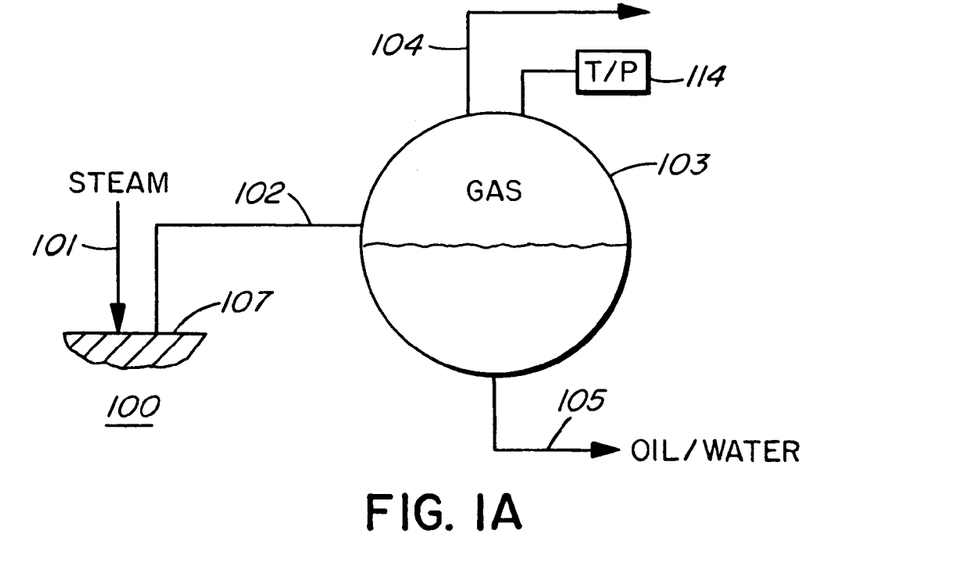
FIG. 1A is a diagrammatic view illustrating the flow of heavy oil and process gas from the production well and further illustrating the separation of the oil and liquid water from the gases during the separation process.

Referring initially to FIG. 1A, a production or exploratory well is generally illustrated at 100. The well 100 is used to obtain heavy or high viscous oil from a formation (not illustrated) below the ground surface 107. A steam line 101 is provided to allow for the injection of steam into the oil bearing formation to reduce the viscosity of the oil flowing from the formation to the well tubing (not illustrated) and to thereby allow enhanced flow of the heavy oil desired to be obtained to the surface.

An outlet line 102 carrying oil, liquid and gaseous water, hydrocarbons, natural gas and carbon dioxide extends from the production well 100 and leads to a separator 103. The oil and liquid water exit from separator 103 at line 105 and are gathered for further processing which further processing is not germane to the present application. The process gas exits from separator 103 at line 104. The process gas contains hydrocarbons, gaseous water and carbon dioxide. The temperature and pressure conditions within the separator 103 are monitored and known by way of sensors or transducers 114.

Figure 1B:
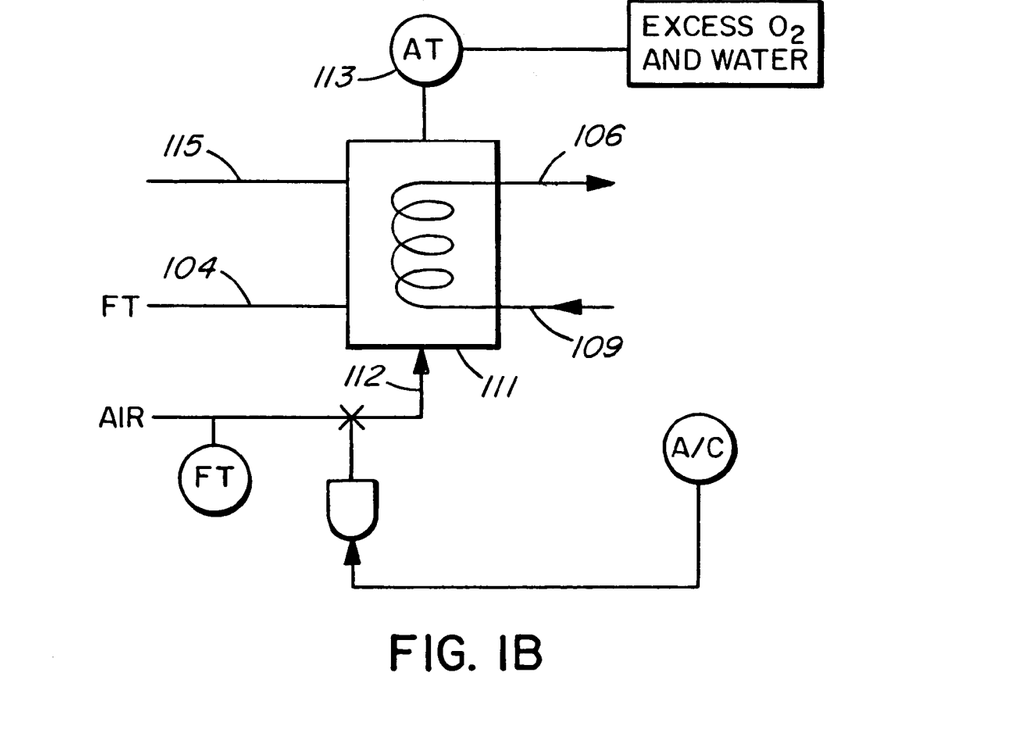
FIG. 1B is a diagrammatic view of the steam generating process using the process gas obtained from the separation of FIG. 1A and using added air and purchase gas and further including a feedback loop which provides an oxygen analysis of the exhaust leaving from the stack of the steam generator.
Figure 2:
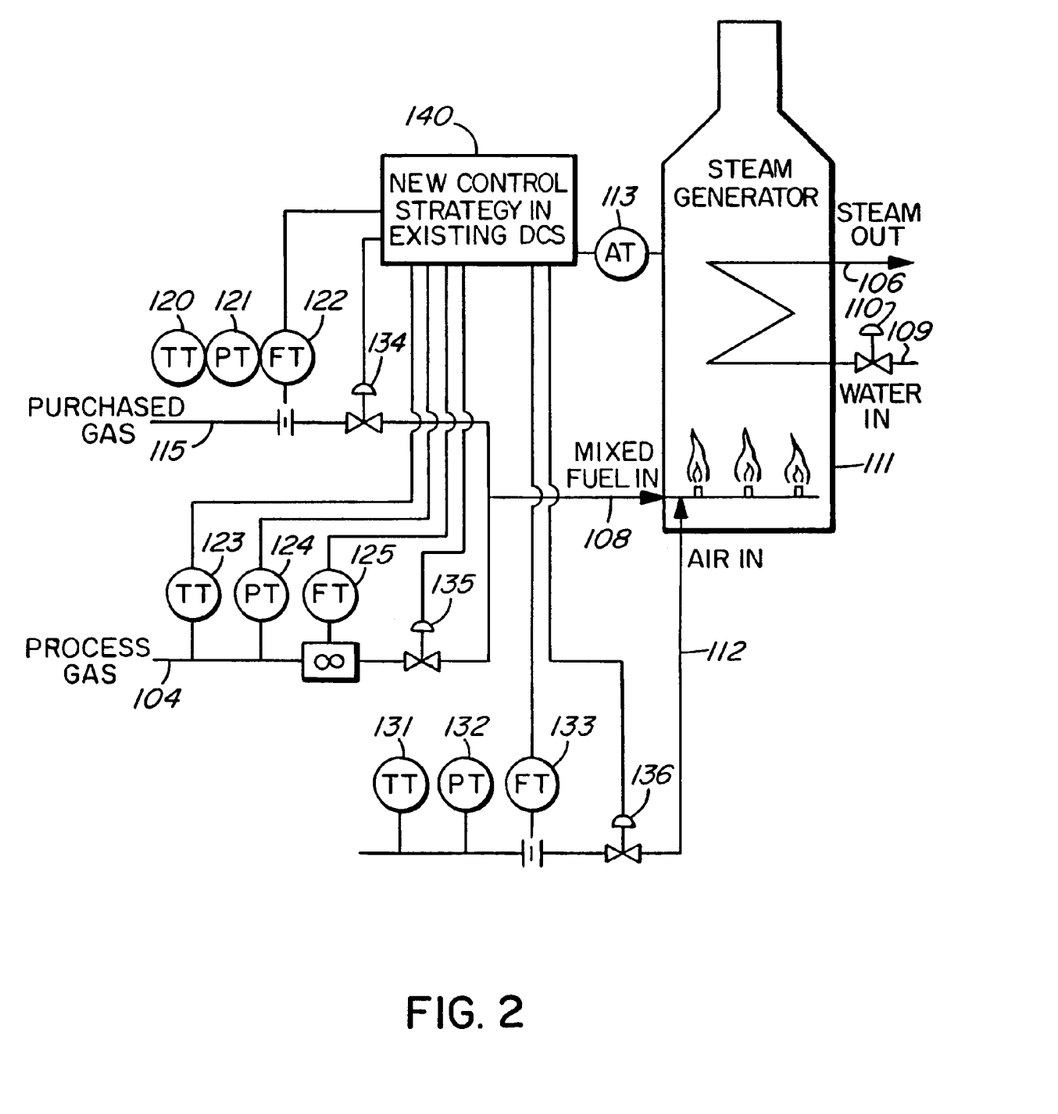
FIG. 2 is a diagrammatic view of the steam generating process similar to that of FIG. 1B but with more circuit and instrumentation detail shown of the process.
Figure 3A:
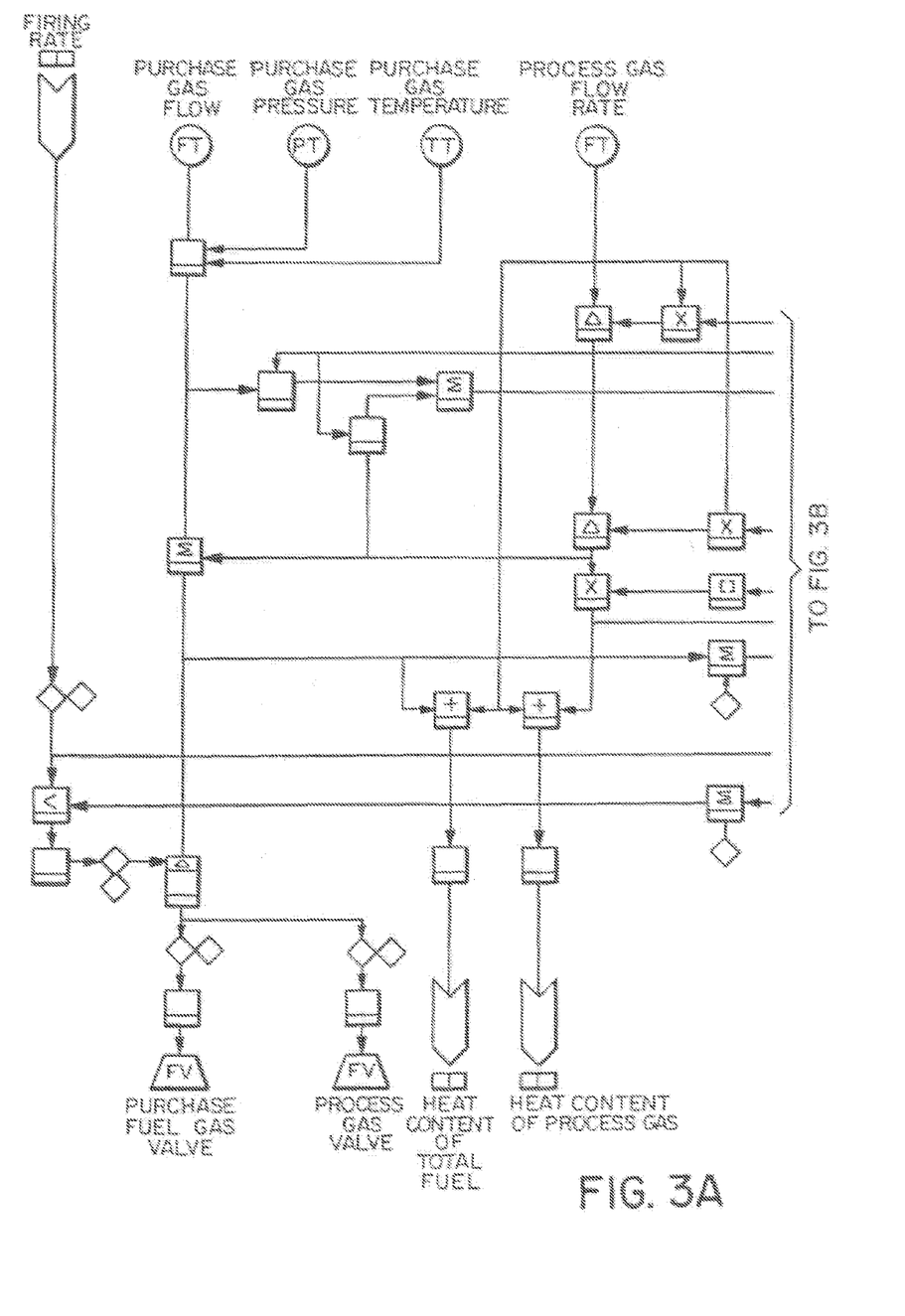
FIG. 3 is a diagrammatic schematic diagram illustrating the overall steam generation process control according to the invention.
Figure 3B:
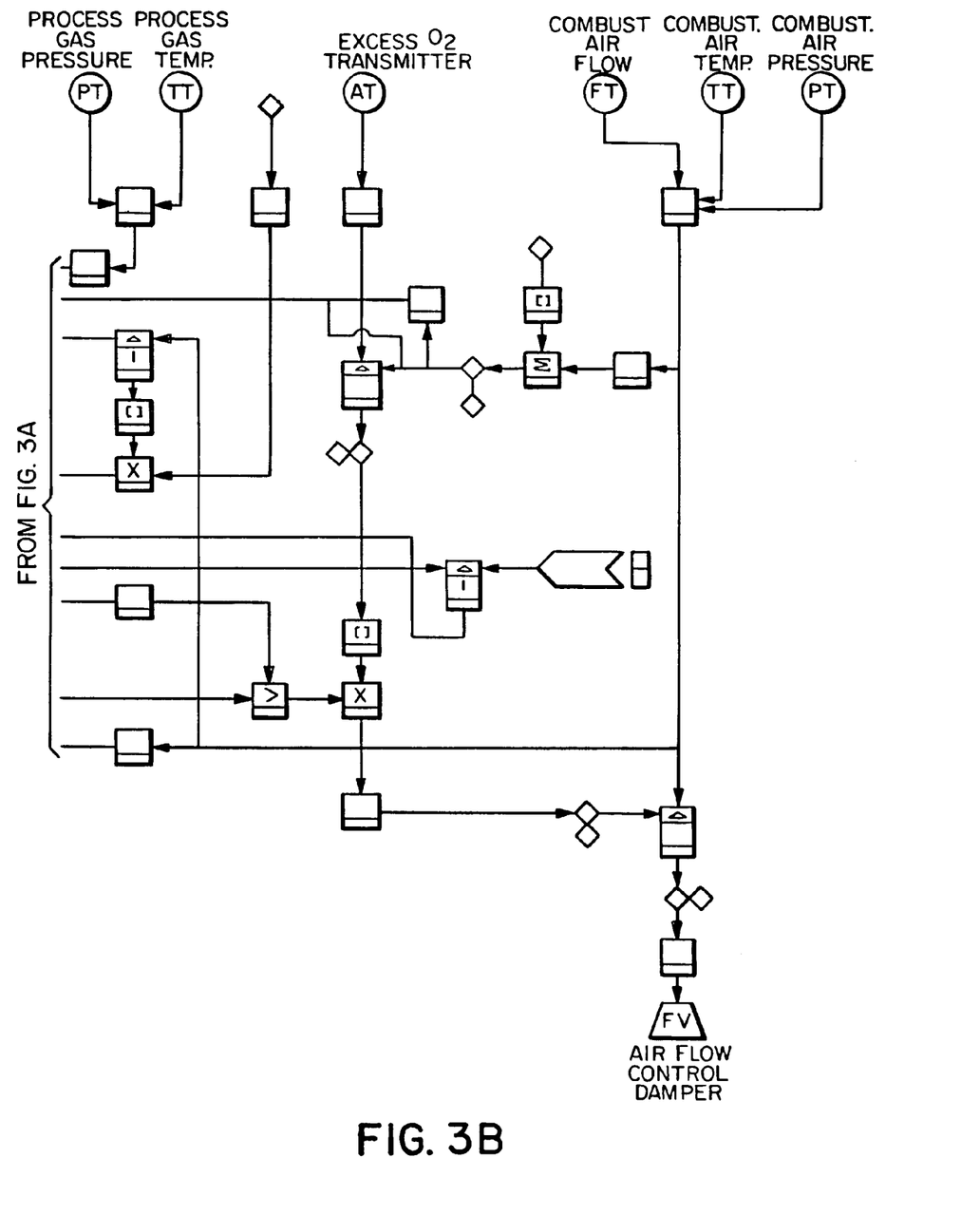

FIG. 1B illustrates the steam generator 111 which produces the steam used for injection into the well formation and which steam generation utilises the process gas entering through line 104. The process gas exiting from separator 103 via line 104 (FIG. 1A) is inletted to the steam generator 111 (FIG. 1B) by inlet line 104 and purchase gas, if required, is also inletted to steam generator 111 via purchase gas inlet line 115. The purchase gas in purchase gas line 115 is conveniently mixed with the process gas with reference to FIG. 2 prior to entering the steam generator 111 through mixed gas inlet line 108. Alternatively, the purchase gas line 115 could directly enter the steam generator 111. It will be appreciated that purchase gas with its known energy content may not always be required if the hydrocarbon content of the process gas alone is sufficiently high to generate the steam having the desired energy content and quantity for formation injection.

In addition to the purchase gas entering steam generator 111 through line 115 and the process gas entering steam generator 111 through line 104 (FIG. 1B), air enters the steam generator 111 through air inlet line 112. It is desirable to calculate the optimal amount of air required for combustion purposes.

The temperature, pressure and flow rate of the purchase gas are known by way of temperature, pressure and flow transducers 120, 121, 122, respectively or, alternatively, the temperature and pressure characteristics of the process gas may be assumed. Likewise, the temperature, pressure and flow characteristics of the process gas entering the steam generator 111 by way of line 104 are known by utilising temperature, pressure and flow transducers 123, 124, 125, respectively. Since the composition of the purchase gas is known, existing technology may be used for measuring the flow rate of the purchase gas by way of a flow meter 122 (FIG. 2) which need not be a mass flow meter although such mass flow meters are conveniently available. For example, a temperature and pressure compensated volumetric meter may be used. However, the flow rate of the process gas will be obtained by a mass flow meter 125, conveniently a Coriolis mass flow meter or the like.

The air entering the steam generator 111 through line 112 is monitored by way of existing temperature, pressure and flow rate transducers 131, 132, 133, respectively. Alternatively, temperature and pressure may be assumed. Valves 134, 135, 136 controlled by a controller 140 (FIG. 2), control the quantity of purchase gas, process gas and air, respectively, entering the steam generator 111.

Water used for generating the desired steam enters the steam generator 111 through inlet line 109. The water is heated within the steam generator 111 and the steam generated leaves the steam generator 111 via line 106 where it is subsequently injected into the formation of the well 100 through injection line 101 (FIG. 1A) as earlier described. A valve 110 (FIG. 2) controls the quantity of water entering the steam generator 111 through inlet line 109 which quantity is known by way of a flow meter (not illustrated). An oxygen analyser 113 (FIG. 1B) is provided to measure the oxygen content of the exhaust gases exiting from the steam generator 111 during combustion of the fuel and air entering the steam generator 111 via lines 108, 112, respectively (FIG. 2), at the correct ratio to more closely obtain optimal combustion within the steam generator 111.

OPERATION

It is desirable to provide the proper quantity of air required for optimal combustion of the purchase and process gas entering the steam generator 111 to provide optimal fuel efficiency for steam generation. It is ordinarily difficult to easily and expediently measure and obtain the correct air/fuel ratio because the quantity of hydrocarbons within the process gas is not known and may vary significantly. Therefore, the energy content of the hydrocarbons within the process gas is not known. In any event, the percentage composition of the various and individual hydrocarbons within the process gas are not known in real time even if the total hydrocarbon quantity is known at other times during operation.

On a mass basis as opposed to a volumetric basis, the ratio of air to fuel is substantially and practically independent of the mass of the various individual hydrocarbon gases in the process gas if only hydrocarbons are present. Accordingly, the mass flow of the process gas from line 104 (FIG. 2) is conveniently measured with a Coriolis mass flow meter 125. However, the process gas includes significant quantities of non-hydrocarbon components such as water, water vapor and carbon dioxide which components do not contribute to the energy content of the process gas but which do contribute to its mass. Appropriate correction is therefore required to the mass flow measurement of the process gas to obtain the optimum air to fuel ratio to compensate for the non-hydrocarbon components.

To obtain the net hydrocarbon mass flow rate, which will then allow the correct quantity of air to be added for optimal combustion, the quantity of water and carbon dioxide in the process gas must be obtained. To obtain this quantity, it is assumed that the process gas passing through line 104 is saturated with water vapor. This assumption is justified because the process gas has been in intimate contact with the injected steam since mixing with the steam in the well formation and travelling to the surface of the well 100 and being exposed to separation within separator 103. By utilising this assumption and using the temperature and pressure readings from temperature and pressure instruments 123, 124, the mass fraction of the water content of the process gas is readily calculated using look up tables (LUT's) or engineering property estimators based on known or experimental data earlier obtained.

The content of carbon dioxide (CO2) and/or other inert substances in the process gas is next desired. "Inert" in this application is intended to mean a substance that does not participate in the combustion process (i.e., is not combustible). This is obtained by measuring the oxygen in the flue gas leaving from the steam generator 111 with oxygen analyser 113 (FIG. 1B). First, a "nominal" value for carbon dioxide content is assumed. The total flow of air is then measured and the reading of excess oxygen from oxygen analyser 113 is used to back calculate the carbon dioxide content of the process gas by the controller 140 which will give a "calculated" value for the quantity of carbon dioxide in the process gas entering from line 104 and for the amount of air that is required to be used for the measured amount of excess oxygen obtained from oxygen analyser 113.

This calculated value for the quantity of air required is then compared with the actual value of the air being supplied which flow is being measured by flow sensor 133. The previously obtained calculated value for the air required as obtained from the oxygen analyzer 113 will be adjusted until the calculated air requirement matches the actual air required at which point the actual quantity of carbon dioxide within the process gas is then known.

Since the total mass flow of the process gas is known by way of the Coriolis meter 125 and since the water and carbon dioxide mass content of the process gas are also now known from the techniques aforesaid, the hydrocarbon mass content of the process gas can readily be calculated by subtracting the water and carbon dioxide quantities from the mass of process gas which is being measured. Since the energy content of the total hydrocarbon content of the process gas is largely independent of the individual hydrocarbon content on a mass basis, the correct quantity of air required for optimal combustion of the process gas is readily obtained using combustion stoichiometry and designed excess oxygen requirements without relying exclusively on the otherwise slow feedback process provided from the oxygen analyser or calorimeter. Small errors in the optimum ratio of air to process fuel are corrected more slowly thereafter in a "trimming" process using feedback control from the excess oxygen analyser.

Figure 4:
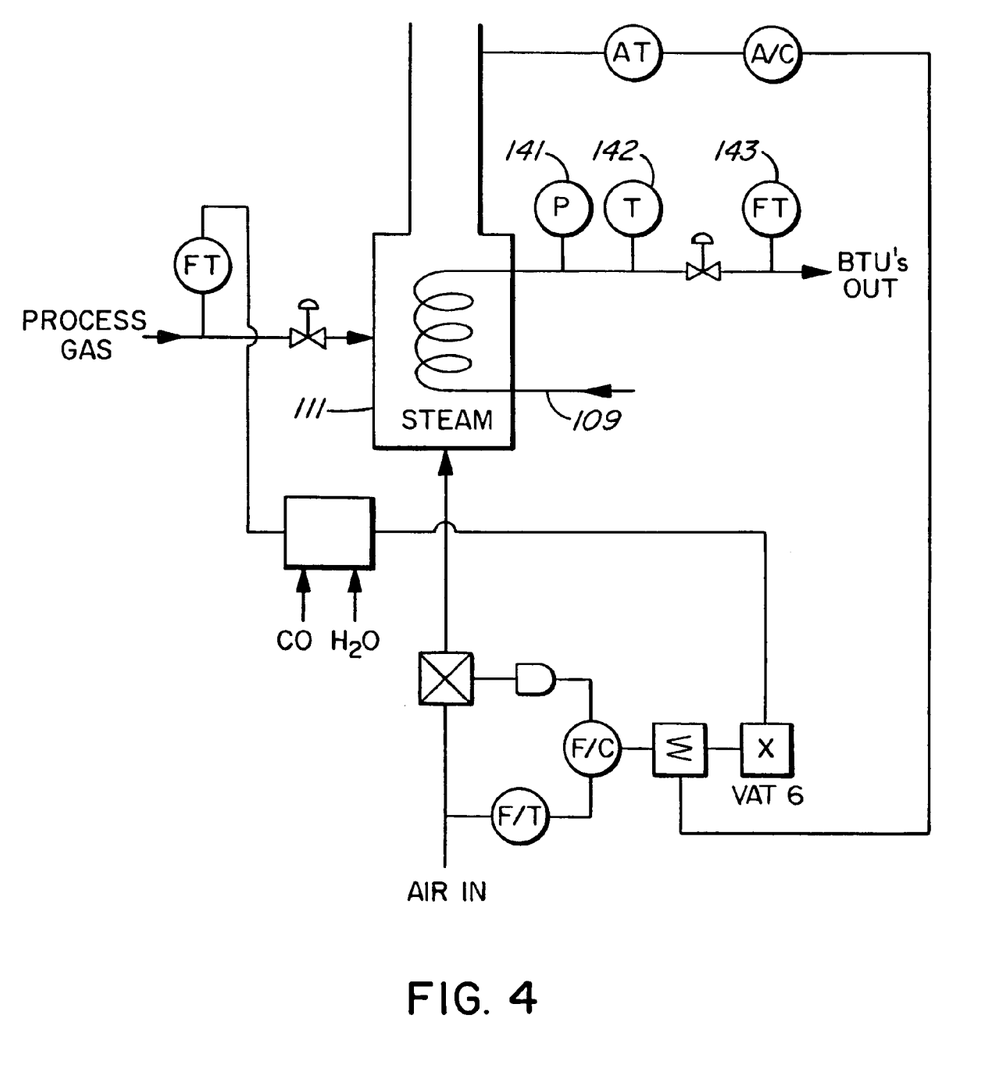
FIG. 4 is a diagrammatic view of the steam generator and its associated gas streams illustrating a further aspect of the invention when the steam generating process requires steam of a specific energy content for obtaining the optimum fuel/water ratio in the steam generating process.

In addition to calculating the correct ratio of air to process and/or purchase fuel in order to provide optimum combustion for steam generation, the quantity of the fuel supplied with the air in the proper ratio will also be required to be sufficient or proper to provide the required amount of steam at a desired quality for the injection process. To this end, reference is made to FIG. 4 where it is assumed, by way of example, that 80% quality steam is to be used for the formation injection process although, of course, other steam qualities can be used in different applications. Accordingly, it is assumed that the steam in the present example is to have 80% by mass of vapor and 20% by mass of liquid. It is further assumed in this example that the quantity of 80% steam produced will require a defined amount of energy, measured in BTU/hour, for injection into the heavy oil bearing formation.

By using the values obtained for carbon dioxide, water and hydrocarbon content of the process gas earlier described, a calculated value for the total energy content of the process and/or purchase gas provided to the generator 111 is obtained. This value is compared to the actual energy of the steam leaving the generator 111 again within controller 140 as the pressure and flow rate of the steam leaving the steam generator 111 through line 106 are known from pressure and temperature transducers 141, 142, respectively, and flow rate transducer 143. The "trimming" process heretofore described will be similarly applied to the process and purchase gas supplied to the steam generator 111, the quantity of the gas being quickly increased if additional energy content is required to produce the required energy demand in the steam generated by steam generator 111. The fuel and the air in the proper ratio which are required for optimum combustion are increased or decreased accordingly using the valves 133, 134, 135 (see also FIG. 2) through controller 140.

Thus, it will be seen that by utilising calculated values for energy content of the process gas and of the fuel/air ratio, changes to the fuel and air flow may be quickly made for desired changes in energy content due to changes in process gas composition and steam demand without exclusively relying on slower instrument analysis and feedback resulting therefrom which delays the decision making process and the control of the fuel and air supply.

While the technology has been particularly described and used in association with steam generator for formation injection, there are other applications where the technique could be similarly useful, such as the use of process gas for many other heating applications such as using process gas for process heating used to raise the temperature of a liquid or gas. Or, using the process gas as a fuel for a fire heater.

Many further modifications will readily occur to those skilled in the art to which the invention relates and the embodiments described should be taken as illustrative of the invention only and not as limiting its scope as defined in accordance with the accompanying claims.

I claim:

1. A method of enhancing the combustion of a process gas with added air by adjusting the air used in said combustion comprising the steps of measuring the mass of said process gas provided for said combustion, estimating the mass of water in said process gas, obtaining the mass of non-combustible gases in said process gas by measuring the percentage of excess oxygen in the exhaust from said combustion of said process gas and said added air, obtaining the mass of hydrocarbons in said process gas and determining the optimum ratio of combustion air relative to said total mass of said hydrocarbons in said process gas and increasing or decreasing the supply of said combustion air relative to said total mass of said hydrocarbons in said process gas.

2. A method as in claim 1 wherein said non-combustible gas(es) include carbon dioxide, nitrogen and ammonia.

3. A method as in claim 1 wherein said percentage of excess oxygen in said exhaust is measured by obtaining the mass of oxygen remaining from said combustion of said process gas and said air.

4. A method as in claim 3 wherein said combustion or said process gas and said air takes place in association with a steam generator.

5. A method of optimising the combustion of a process gas composed of hydrocarbon and non-combustible gases when the proportion of said non-combustible to said hydrocarbon gases increases or decreases, said method comprising increasing or decreasing the quantity of combustion air to said process gas in a ratio dependent upon the total mass of hydrocarbons, water and carbon dioxide in said process gas, analysing the excess oxygen content of the exhaust gases from the combustion of said process gas and said combustion air to ensure an adequate quantity of combustion air is present for said optimum combustion and increasing or decreasing said combustion air following said analysis in order to obtain said optimal combination of said combustion air and said process gas.

6. Method of enhancing the combustion of a process gas by adjusting added air to be used in said combustion comprising the steps of measuring the mass flow of said process gas, measuring the percentage of excess oxygen in the exhaust from said combustion of said air and process gas, obtaining the respective masses of non-combustible gas(es), hydrocarbons and water in said process gas from said obtained percentage of excess oxygen, determining the optimum ratio of combustion air relative to said total mass of said hydrocarbons and increasing or decreasing said combustion air in said ratio proportional to the increase or decrease in said total mass of said process gas supplied for said combustion.

7. A method as in claim 6 wherein said non-combustible gas(es) include carbon dioxide, nitrogen and ammonia.

8. Method as in claim 6 wherein said combustion air is increased or decreased based on said increase or decrease of said non-combustible gas(es) in said combustion gas and wherein said increase or decrease in said added air is provided by an exhaust analyzer analysing the exhaust from said combustion of said process gas and added air.

9. Method of enhancing the combustion of a process gas composed of hydrocarbons and non-combustible gases and water when the proportion of said non-combustible gas(es) and/or water to said hydrocarbons increases or decreases, said method comprising increasing or decreasing the combustion air added to said process gas in a ratio dependent upon the total mass of said process gas, analysing the excess oxygen content of the exhaust gases from said combustion to ensure an adequate quantity of combustion air is present for optimum combustion of said process gas and increasing or decreasing said combustion air following said analysis of said exhaust gases thereby to more correctly approach said optimum combustion.

10. Method as in claim 9 wherein said non-combustible gas(es) include nitrogen, carbon dioxide or ammonia.

* * * * *